United States Patent
Phillips et al.

(10) Patent No.: US 10,294,136 B2
(45) Date of Patent: May 21, 2019

(54) PRODUCTION OF BIOMASS FOR USE IN THE TREATMENT OF FISCHER-TROPSCH REACTION WATER

(71) Applicant: Sasol Technology (Proprietary) Limited, Johannesburg (ZA)

(72) Inventors: Trevor David Phillips, Vanderbijlpark (ZA); Maria Petronella Augustyn, Secunda (ZA); Ignatius Michael Van Niekerk, Secunda (ZA)

(73) Assignee: SASOL TECHNOLOGY (PROPRIETARY) LIMITED, Johannesburg (ZA)

( * ) Notice: Subject to any disclaimer, the term of this patent is extended or adjusted under 35 U.S.C. 154(b) by 167 days.

(21) Appl. No.: 14/900,670

(22) PCT Filed: Jun. 25, 2014

(86) PCT No.: PCT/IB2014/062581
§ 371 (c)(1),
(2) Date: Dec. 22, 2015

(87) PCT Pub. No.: WO2014/207667
PCT Pub. Date: Dec. 31, 2014

(65) Prior Publication Data
US 2016/0152500 A1  Jun. 2, 2016

Related U.S. Application Data

(60) Provisional application No. 61/839,914, filed on Jun. 27, 2013.

(30) Foreign Application Priority Data

Jun. 27, 2013  (ZA) .................................. 2013/04816

(51) Int. Cl.
C02F 3/12 (2006.01)
C02F 3/34 (2006.01)
(Continued)

(52) U.S. Cl.
CPC .................. *C02F 3/34* (2013.01); *C02F 3/12* (2013.01); *C02F 3/30* (2013.01); *C02F 2101/32* (2013.01);
(Continued)

(58) Field of Classification Search
None
See application file for complete search history.

(56) References Cited

U.S. PATENT DOCUMENTS 3,764,523 A * 10/1973 Stankewich, Jr. ........ C02F 1/52
210/604
3,940,332 A * 2/1976 Kato ..................... C02F 3/1231
210/601
(Continued)

FOREIGN PATENT DOCUMENTS

CN   102502950 A * 6/2012

OTHER PUBLICATIONS

Doumbou, C. L., et al., "Selection and Characterization of Microorganisms Utilizing Thaxtomin A, a Phytotoxin Produced by Streptomyces scabies," Appl Environ Microbiol. Nov. 1998; 64(11): 4313-4316.*
(Continued)

*Primary Examiner* — Chester T Barry
(74) *Attorney, Agent, or Firm* — Barnes & Thornburg LLP; G. Peter Nichols

(57) ABSTRACT

A process for producing a biomass for use in the treatment of Fischer-Tropsch (FT) reaction water includes introducing a nutrient component comprising Carbon (C), Nitrogen (N) and Phosphorus (P), and water into an aerobic reaction zone
(Continued)

containing a sewage sludge, and maintaining, in the aerobic reaction zone and under aerobic conditions, a F/M ratio of 0.25-2 kg COD/kg MLSS, where F/M=Food to Microorganism Ratio; COD=Chemical Oxygen Demand, expressed as mg oxygen/B of liquid in the aerobic reaction zone; and MLSS=Mixed Liquor Suspended Solids, expressed as mg solids in the aerobic reaction zone/B of liquid in the aerobic reaction zone. The F/M ratio is maintained for a period of time, to produce a biomass suitable for use in the treatment of FT reaction water.

16 Claims, 4 Drawing Sheets

(51) Int. Cl.
| | | |
|---|---|---|
| C02F 3/30 | (2006.01) | |
| C02F 101/32 | (2006.01) | |
| C02F 101/34 | (2006.01) | |
| C02F 103/36 | (2006.01) | |

(52) U.S. Cl.
CPC .... C02F 2101/34 (2013.01); C02F 2103/365 (2013.01); C02F 2209/02 (2013.01); C02F 2209/06 (2013.01); C02F 2209/07 (2013.01); C02F 2209/08 (2013.01); C02F 2209/10 (2013.01); C02F 2209/22 (2013.01); C02F 2209/40 (2013.01); C02F 2305/06 (2013.01); Y02W 10/15 (2015.05)

(56) References Cited

U.S. PATENT DOCUMENTS

| | | | | |
|---|---|---|---|---|
| 4,165,281 | A * | 8/1979 | Kuriyama | C02F 3/10 210/150 |
| 7,150,831 | B2 * | 12/2006 | Dancuart Kohler | C02F 9/00 210/601 |
| 2005/0131086 | A1 * | 6/2005 | Dancuart Kohler | C02F 9/00 210/631 |
| 2005/0205490 | A1 * | 9/2005 | Park | C02F 3/308 210/605 |
| 2007/0267346 | A1 * | 11/2007 | Sengupta | C02F 3/04 210/610 |
| 2008/0006577 | A1 * | 1/2008 | Choi | C02F 1/465 210/631 |
| 2010/0061905 | A1 * | 3/2010 | van Dyk | B01D 53/54 423/236 |
| 2011/0097701 | A1 * | 4/2011 | Hickey | B01D 53/1425 435/3 |
| 2011/0178186 | A1 * | 7/2011 | Oh | B01J 23/75 518/700 |
| 2012/0301933 | A1 * | 11/2012 | Smith | C12P 7/625 435/135 |
| 2013/0008774 | A1 * | 1/2013 | Carnelli | C02F 1/04 203/38 |
| 2013/0085683 | A1 * | 4/2013 | Garcia | C02F 3/006 702/25 |
| 2013/0309757 | A1 * | 11/2013 | Kim | C12M 47/06 435/257.3 |
| 2014/0069864 | A1 * | 3/2014 | Wett | C02F 3/006 210/605 |
| 2014/0217015 | A1 * | 8/2014 | Larsen | C02F 3/006 210/605 |
| 2014/0367333 | A1 * | 12/2014 | Razavi-Shirazi | C02F 3/303 210/615 |
| 2015/0021264 | A1 * | 1/2015 | Tsuda | B01D 61/04 210/605 |
| 2015/0064309 | A1 * | 3/2015 | Madrid | C12N 9/20 426/61 |
| 2015/0139959 | A1 * | 5/2015 | Zhou | A23L 3/3571 424/93.4 |

OTHER PUBLICATIONS

Hong Chua, "Effect of Food:Microorganism Ratio oin Activated Sludge Foam Control," Applied Biochemistry and Biotechnology, vol. 84-86 (2000), p. 1127-1135.*

Omara, J., "Isolation, screening, and Characterization of microbes with potential application in teh treatment of Kampala City Abattoir," (Feb. 2013), http://hdl.handle.net/10570/2062.*

International Search Report for International Patent Application No. PCT/IB2014/062581, European Patent Office, dated Oct. 10, 2014.

International Preliminary Report on Patentability for International Patent Application No. PCT/IB2014/062581, European Patent Office, dated Oct. 9, 2015.

Al-Malack et al., "Determination of biokinetic coefficients of an immersed membrane bioreactor," *Journal of Membrane Science*, 2005, vol. 271, No. 1-2, pp. 47-58.

Li Liu et al., "Cultivation of aerobic granular sludge with a mixed wastewater rich in toxic organics," *Biochemical Engineering Journal*, 2011, vol. 57, pp. 7-12.

J-H Tay et al., "Microscopic observation of aerobic granulation in sequential aerobic sludge blanket reactor," *Journal of Applied Microbiology*, 2001, vol. 91, No. 1, pp. 168-175.

Written Opinion of the International Searching Authority for International Patent Application No. PCT/IB2014/062581, dated Oct. 9, 2015.

* cited by examiner

PRODUCTION OF BIOMASS FOR USE IN THE TREATMENT OF FISCHER-TROPSCH REACTION WATER

This application is a US National Stage Application of and claims priority to PCT/IB2014/062581, filed Jun. 25, 2014, to U.S. Provisional Patent Application No. 61/839,914 filed Jun. 27, 2013 and to South African Application No. 2013/04816 filed Jun. 27, 2013; the entire contents of each are incorporated herein by reference.

FIELD OF INVENTION

This invention relates to the production of biomass for use in the treatment of industrial waste water. It relates in particular to a process for producing biomass for use in the treatment of Fischer-Tropsch reaction water, to biomass thus produced, and to a process for treating Fischer-Tropsch reaction water.

BACKGROUND TO THE INVENTION

Biological treatment using bacteria and other microorganisms (biomass) to remove biodegradable organic contaminants through assimilation is known in waste water treatment. The biomass degrades and converts the organics in the waste water into $CO_2$, and also incorporates part of the organics as biomass.

Fischer-Tropsch (FT) synthesis is a process which converts synthesis gas, containing hydrogen and carbon monoxide, into hydrocarbon products. The FT process produces hydrocarbons which may be processed further to produce products such as synthetic crude oil, olefins, solvents, lubricating oil, industrial or medicinal oil, waxy hydrocarbons, oxygen-containing compounds, motor gasoline, diesel fuel and jet fuel. However, a significant product of the FT process is water, hereinafter referred to as "Fischer-Tropsch reaction water" or "FT reaction water". FT Synthesis has been described extensively in literature, such as "Fischer-Tropsch Technology" by A. P. Steynberg & M. E. Dry, Studies in Surface Science and Catalysis 152, Elsevier (2004).

The products of the FT process are typically subjected to preliminary separation, for example phase separation, wherein the FT reaction water is separated from the rest of the FT products. FT reaction water contains some hydrocarbons including oxygenated hydrocarbons such as aliphatic, aromatic and cyclic alcohols, aldehydes, ketones and acids, and to a lesser extent aliphatic, aromatic and cyclic hydrocarbons such as olefins and paraffins. The composition of FT reaction water is dependent on the catalyst metal used in the FT reactor and the reaction conditions employed. Notwithstanding, all FT reaction water is unique in that it contains substantial amounts of short chain fatty acids (SCFA) or volatile fatty acids (VFA) and alcohols. Since these SCFAs and alcohols typically cannot be recovered economically, FT reaction water is usually treated biologically.

FT reaction water is produced immediately upon the start-up of the FT process, and as mentioned above constitutes a significant portion of the FT product. Therefore the treatment of FT reaction water is also required immediately upon the start-up of the FT process. However, due to the presence of the SCFA's and alcohols, the typical biomass or activated sludge used in conventional biological waste water treatment processes, such as treatment of domestic waste water, is not suitable for treatment of FT reaction water. Also, although conventional activated sludge can be cultivated to produce biomass that is suitable for treatment of the FT reaction water, such cultivation of a suitable biomass can take up to three months.

The Applicant has devised a process for cultivating biomass or activated sludge with a synthetic feed stream to produce a biomass that is suitable for treatment of FT reaction water to a specification that is acceptable for environmental release, irrigation or reuse in process cooling.

SUMMARY OF THE INVENTION

According to a first aspect of the invention, there is provided a process for producing biomass for use in the treatment of Fischer-Tropsch (FT) reaction water, which process includes introducing a nutrient component comprising Carbon (C), Nitrogen (N) and Phosphorus (P), and water, into an aerobic reaction zone containing a seed sludge;

maintaining, in the aerobic reaction zone and under aerobic conditions, an F/M ratio of 0.25-2 kg COD/kg MLSS.

where F/M=Food to Mass Ratio;

COD=Chemical Oxygen Demand, expressed as mg oxygen/l of liquid in the aerobic reaction zone; and MLSS=Mixed Liquor Suspended Solids, expressed as mg solids in the aerobic reaction zone/l of liquid in the aerobic reaction zone, for a period of time, thereby to produce a biomass suitable for use in the treatment of FT reaction water.

The seed sludge may, in particular, be aerobic domestic activated sludge, which may be obtainable from a conventional domestic sewage treatment plant.

The F/M ratio that is maintained in the aerobic reaction zone may, in particular, be in the range of from 0.4 to 1 kg COD/kg MLSS. Typically, 20 the F/M ratio may be about 0.8 kg COD/kg MLSS.

The Carbon (C) in the nutrient component may be provided by at least one short chain fatty acid such as acetic acid, formic acid, butanoic acid or pentanoic acid, or a combination of said at least one short chain fatty acid and at least one alcohol such as methanol, ethanol, butanol, isopropanol or pentanol.

Preferably the C in the nutrient component is provided by a synthetic feed. The synthetic feed may be formulated to substantially match the FT reaction water, typically expected of a fully operational FT process.

Where conditions allow and a suitable source of FT reaction water is available, e.g. a location close to an already operating FT facility, C may be provided by at least a portion of the FT reaction water produced in such facility.

In the nutrient component, C, N and P may be present in a C:N mass ratio of from about 20:1 to 60:1 and in a N:P mass ratio of from about 2:1 to 5:1, where C is expressed as COD.

The MLSS in the aerobic reaction zone may be maintained at about 800 mg/l or above, preferably at about 1500 mg/l or above. Most preferably, the MLSS is maintained at about 3500 mg/l, The pH in the aerobic reaction zone may be maintained in the range of from 6.5 to 7.5, preferably at about 6.8. A minimum alkalinity concentration of 75 mg/l as CaCO3 may be maintained in the aerobic reaction zone.

A dissolved oxygen (DO) concentration of 1.5 to 3.0 mg/l, e.g. 2.5 to 3.0 mg/l, may be maintained in the aerobic reaction zone.

The aerobic reaction zone may be maintained at a temperature in the range of from 32° C. to 42° C. Preferably the reaction zone is maintained at a temperature of about 37° C.

It is important that production of the biomass be continued for a sufficient period of time until the biomass has reached a quantity and quality which renders it suitable for use in treating FT reaction water. Therefore it is preferred that the biomass has a cell residence time ('CRT') in the aerobic reaction zone of from 18 to 45 days, during which time the F/M ratio is maintained within said range in the aerobic reaction zone. Preferably, the CRT of the biomass in the aerobic reaction zone is about 35 days.

The process may include transferring some of the biomass into at least one further aerobic reaction zone once the MLSS of the biomass or sludge produced is above 800 mg/l, and continuing to produce or cultivate biomass in both aerobic reaction zones. Preferably a MLSS of 1500 mg/l or above, more preferably 3500 mg/l or above, is attained prior to the transfer. The cultivation may be continued for a further period of time, while maintaining MLSS of above 800 mg/l, preferably 1500 mg/l or above, over the aerobic reaction zones. The MLSS should preferably not exceed 8500 mg/l.

The at least one further aerobic reaction zone is preferably located downstream of the initial aerobic reaction zone. The process may include recycling of some sludge from at least one aerobic reaction zone to a further zone operated anoxically ("anoxic zone"), e.g. to achieve nitrification/denitrification. Preferably, the anoxic zone is located upstream of the aerobic reaction zones.

The cultivation of biomass, or bio-augmentation and acclimatization, in accordance with the invention, is a carefully controlled process of feeding a pre-determined amount and type of organic components and nutrients to the starting sludge. By managing and monitoring the process, an acclimatised biomass is cultivated that is uniquely adapted to treat FT reaction water.

The invention also extends to biomass when produced by the process of the first aspect of the invention.

According to a second aspect of the invention, there is provided a process for treating FT reaction water, which process includes introducing FT reaction water into an aerobic reaction zone containing biomass obtained from the process of the first aspect of the invention; and maintaining the aerobic reaction zone under aerobic conditions, thereby to treat the FT reaction water, with treated effluent being produced.

In the process of the second aspect of the invention, there may also be provided at least one anoxic zone and/or at least one solid-liquids separation zone. In a preferred embodiment of the invention the solid liquid separation zone is a clarifier. Typically, an anoxic zone, a primary aerobic reaction zone, a secondary aerobic reaction zone, and a solid-liquids separation zone are provided. Preferably, the anoxic zone is located upstream of the primary and secondary reaction zones.

In an embodiment of the second aspect of the invention, the organic loading rate (OLR) may be controlled at about 1.2 kg COD/m$^3$·d.

In the second aspect of the invention, the operating conditions or parameters, i.e. at least pH, DO and temperature in the various zones may be maintained as hereinbefore described in respect of the first aspect of the invention.

The invention will now be described in more detail with reference to the accompanying drawings and the following non-limiting examples.

DETAILED DESCRIPTION OF THE INVENTION

Figure 1:
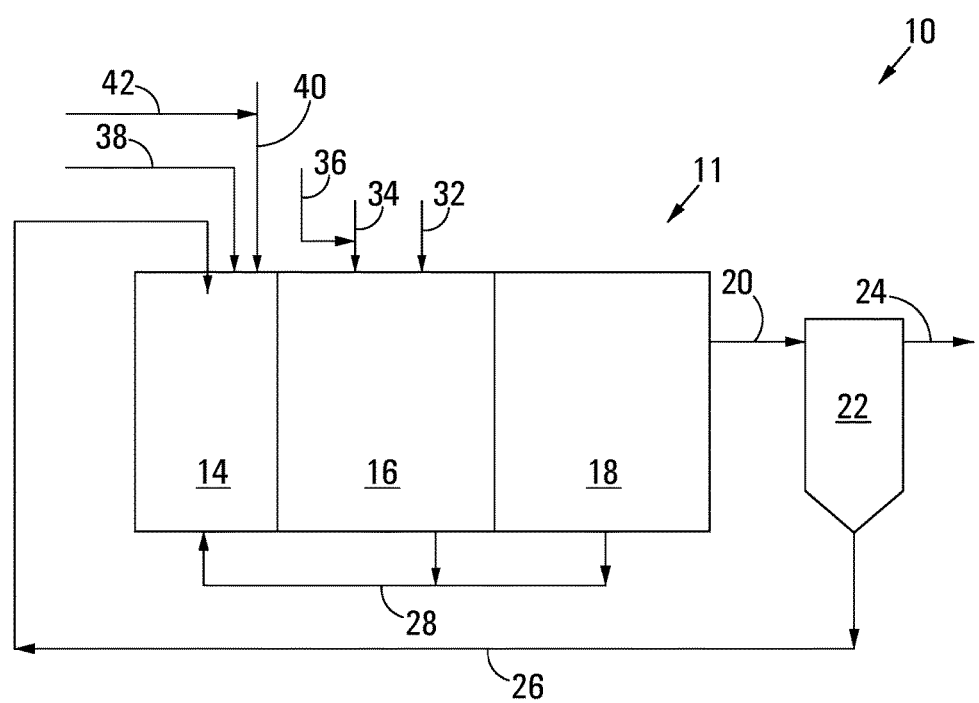
FIG. 1 shows a simplified block diagram of a plant for carrying out a process according to the invention in the treatment of industrial waste water in the form of FT reaction water.

Referring to FIG. 1, reference numeral 10 generally indicates a plant for carrying out the process of the invention, in particular a process for treating industrial waste water in the form of FT reaction water.

The plant 10 includes a reactor, generally indicated by reference numeral 11. The reactor 11 comprises, sequentially, an anoxic zone 14, a primary aerobic reaction zone 16, and a secondary aerobic reaction zone 18. It is possible for the reactor to consist of more reaction zones, depending on the desired design. The plant 10 further includes a solid-liquid separation zone, which in a preferred embodiment is a clarifier 22. Other types of solid-liquid separators such as filters may instead, or additionally, be used. A transfer line 20 leads from the secondary aerobic zone 18 to the clarifier 22. An effluent withdrawal line 24 leads from the clarifier 22. A sludge recycle line 26 leads from the bottom of the clarifier 22 to the anoxic zone 14 of the reactor 11.

A recycle line 28 leads from the aerobic zones 16 and 18 to the anoxic zone 14. This allows for recycling of nitrate rich sludge to the anoxic zone during the stages of cultivation for nitrification/denitrification.

A water stream 32 leads into the primary aerobic zone 16, as does a nutrient component stream 34. A synthetic feed line 36 is also provided for adding synthetic feed to the primary aerobic reaction zone 16, and this line feeds into the nutrient component stream 34.

The plant 10 is commissioned, and the biomass is cultivated and adapted for use in treating FT reaction water, as follows:

Seeding and Initial Growth Phase

On day 1 of the seeding and initial growth phase seed sludge from an aerobic domestic sewage treatment plant is added to the primary aerobic reaction zone 16.

The primary aerobic reaction zone 16 is then filled with a predetermined amount of water, ensuring that aerating devices (not shown) in the zone 16 are covered. The aim is to attain a MLSS concentration, after dilution, of ca. 1500 mg/l, (where "ca" means "about" or "approximately").

The primary aerobic reaction zone 16 is then fed with water, via stream 32, and synthetic feed and nutrients via stream 34. The synthetic feed is fed into the nutrient stream 34 via a separate synthetic feed stream 36. This synthetic feed stream 36 is only operational during the cultivation phase and will be isolated once real feed, derived from the FT process, is added to the plant 10 for treatment. The synthetic feed is used to ensure attainment of the unique species selection and ecological combinations necessary to produce suitable biomass to treat the FT reaction water. The cultivated sludge is preferably maintained using the synthetic feed until FT reaction water is produced for treatment.

In stream 34, nutrients are added to the synthetic feed in such a manner as to ensure a C:N mass ratio of from 20:1 to 60:1 and a N:P mass ratio of from 2:1 to 5:1. The flow rate of water into the primary aerobic reaction zone is determined by the desired F/M ratio and an MLSS concentration of at least 1500 mg/l.

The C:N mass ratio is preferably fixed, at 60:1. The nutrient component feed stream is added at such a rate that an F/M ratio of about 0.8 kg COD/kg MLSS is constantly maintained in the primary aerobic reaction zone 16. The MLSS concentration is a result of the F/M ratio of 0.8 kg COD/kg MLSS and the dilution effect during the filling of the primary aerobic reaction zone with water.

The water, nutrients and synthetic feed components are gradually added to fill the primary aerobic reaction zone 16 over a period of days, such that after the initial growth phase, and, in the case where more than one aerobic reaction zone is employed, upon equalisation across more than one aerobic reaction zone, an MLSS of about 1500 mg/l or above is achieved across the aerobic reaction zones.

A typical nutrient component feed stream consists of diluted macro nutrients, micro nutrients and a carbon source as indicated in Table 1.

TABLE 1

Nutrient dosing in a typical nutrient component feed that includes acetic acid as a carbon source.

| Constituent | Element provided | Macro/micro nutrients | Element concentration (mg/l) |
| --- | --- | --- | --- |
| $CH_3COOH$ | C | Macro | 10 000-20 000 |
| $CH_4N_2O$ | N | Macro | 500-1000 |
| $H_3PO_4$ | P | Macro | 100-200 |
| $K_2HPO_4$ | P and K | Macro/micro | 1-2 and 3-5 |
| $MgSO_4 \cdot 7H_2O$ | Mg and S | Macro/micro | 3-5 and 3-6 |
| $CaCl_2 \cdot 2H_2O$ | Ca | Micro | 1-4 |
| $FeSO_4 \cdot 2H_2O$ | Fe | Micro | 0.5-2.0 |
| $MnSO_4 \cdot 5H_2O$ | Mn | Micro | 0.2-0.8 |
| $ZnSO_4 \cdot 7H_2O$ | Zn | Micro | 0.2-0.8 |
| $CuSO_4 \cdot 5H_2O$ | Cu | Micro | 0.05-0.2 |
| $CoCl_2 \cdot 6H_2O$ | Co | Micro | 0.05-0.2 |
| $NiCl_2 \cdot 6H_2O$ | Ni | Micro | 0.05-0.2 |
| $Na_2MoO_4 \cdot 2H_2O$ | Mo | Micro | 0.05-0.2 |
| $H_3BO_3$ | B | Micro | 0.01-0.1 |
| KI | I | Micro | 0.01-0.1 |

The pH in the primary aerobic reaction zone is controlled between 6.8 and 7.5 by dosing (not shown) an alkali solution, such as NaOH or KOH. It is preferred that a minimum alkalinity concentration of 75 mg/l as $CaCO_3$ is maintained to enhance floc formation.

Dissolved oxygen (DO) concentration is maintained at 1.5 to 3.0 mg/l in the primary aerobic reaction zone to limit filamentous growth.

During the seeding and initial growth phase the temperature in the reactor 11, in particular in the aerobic reaction zones 16 and 18, is maintained at ca. 37° C.

Equalisation of the Sludge Over Both Aerobic Zones

Once the primary aerobic reaction zone 16 is filled completely and the MLSS is >1500, the sludge therein is then distributed over both aerobic reaction zones i.e. the primary aerobic reaction zone 16 and the secondary aerobic reaction zone 18. After distribution, the resulting MLSS in each aerobic reaction zone should preferably be at least 1500 mg/l.

The two aerobic reaction zones are then filled in parallel over a number of 10 days with water and nutrient component feed streams. The nutrient component and synthetic feed stream is used to maintain the F/M ratio at about 0.8 kg COD/kg MLSS and water is used to gradually increase the volumes of the sludge in the primary and secondary aerobic reaction zones. The F/M of 0.8 kg COD/kg MLSS and the dilution effect during the filling 15 of the zones influence the MLSS concentration in both aerobic reaction zones, which should be maintained at above 800 mg/l, preferably at 1500 mg/l or above.

Equalisation of Sludge Over the Total Reactor Volume

Once the sludge in aerobic reaction zones 16 and 18 has grown sufficiently to fill the aerobic reaction zones, the anoxic zone 14 and the clarifier 22 will also have been filled with water.

The water flow in the water stream 32 is decreased such that the water levels in the reactor 11 and clarifier 22 are maintained at full, however, without any effluent being discharged to the clarifier 22 i.e. zero up-flow velocity in the clarifier 22. Thereafter a sludge recycle pump (not shown) is started and operated at maximum capacity so that sludge is discharged into the sludge recycle stream 28 and fed to the anoxic zone 14. Water, and nutrients including the synthetic feed, are then introduced into anoxic zone 14, via streams 38 and 40 respectively. At this stage the flow of the nutrient component stream 40 to the anoxic zone 14 is such that an F/M of 0.8 kg COD/kg MLSS is maintained throughout the total reactor volume while not exceeding an organic loading rate (OLR) of 1.2 kg COD/$m^3 \cdot$day. The sludge is continuously monitored to ensure that it is of good quality. Once homogenisation is achieved i.e. the sludge concentration in the aerobic reaction zones 16, 18 and recycle stream 28 is the same, the flowrate of the nutrient component feed stream 40 into the anoxic zone 14 is increased. The flow rate of the water in stream 38 into the anoxic zone 14 and stream 32 into the aerobic reaction zones 16, 18 is also increased to the extent that an effluent is discharged from the reactor ((or alternatively aerobic reaction zones 16 and 18) to the clarifier through effluent discharge stream 20.

Dissolved oxygen, pH and temperature are controlled as mentioned above in zones 16 and 18.

Once the clarifier 22 has begun overflowing and the system has stabilised after the split of the water and nutrients, de-sludging will start at such a rate as to maintain a biomass CRT of 18-45 days—taking into account biomass losses via the clarifier. The C:N ratio in the nutrient component feed streams 34 and 40 will be managed to maintain a ratio of 20:1.

Microscopic analyses to determine sludge quality is important. The main objective during this period of cultivation is to grow sufficient sludge of good quality. An acceptable sludge quality is:

MLSS=3500 mg/l
SVI (Sludge Volume Index)<150 ml/g
Solid round flocs
Low in filamentous content
Protozoa presence
Sludge is aerobic in nature Introduction of FT Reaction Water Once the sludge has been cultivated to the extent that it can treat FT reaction water, FT reaction water effluent from an FT process is gradually introduced into the reactor 10 via the nutrient stream 40. The FT reaction water is fed into nutrient stream 40 via a separate FT reaction water stream 42.

The FT reaction water enters the reactor 10, at the anoxic reaction zone 14. Thereafter it moves into the primary and secondary reaction zones 16 and 18. The product from the reactor overflows into the clarifier 22, wherein treated water is removed overhead via a treated water stream 24, and the biomass reports to the bottom of the clarifier 22. The biomass from the clarifier 22 is fed to the anoxic reaction zone 14, via stream 26.

The flow rate of FT reaction water feed stream 42 is increased gradually over a 72 h period while at the same time decreasing the nutrient component in the nutrient stream 40 flow rate in such a manner as to maintain an organic loading rate (OLR) of ca 1.2 kg COD/m³·d.

The temperature of the zones 16, 18 is maintained at ca. 37° C.

Minimum phosphate concentrations (10 mg/l as $PO_4^{3-}$) are maintained in the FT reaction water stream 42 to the reactor 11.

The pH, temperature and DO are controlled as herein before described.

During the treatment of the FT reaction water, sludge is harvested to maintain a CRT of 18 to 35 days, preferably 18 days.

EXAMPLE

Aspects of the plant 10 were tested by means of laboratory scale experiments.

The experiments were conducted using six 0.2 m³ pilot reactors, hereinafter referred to as Reactors 1 to 6. Each reactor comprised two zones, representative of the primary aerobic reaction zone 16 and the secondary aerobic reaction zone 18 in the plant 10.

During the seeding and initial growth stage, seed sludge was added to the primary reaction zone and cultivated using acetic acid as a primary carbon source.

The biomass concentration in the sludge was permitted to increase to the extent that on transfer of the sludge to the secondary aerobic reaction zone of the reactor the MLSS concentration was above 1500 mg/l throughout the system. After the distribution of the sludge between the primary and secondary aerobic reaction zones the primary zone was operated anoxically and the secondary aerobic reaction zone was operated aerobically with an internal recycle to an anoxic zone for denitrification purposes. This was done for the promotion and selection of nitrifying and denitrifying bacterial ecology in the system.

The experiments were conducted in two modes. In the first mode each reactor was operated at a different F/M ratio within the range of from 0.2 to 2 kg COD/kg MLSS·d. In this instance, the start-up MLSS was kept at 3500 mg/l across all the digesters. In the second mode of operation the start-up MLSS across Reactors 1 to 3 was varied from 800 to 3500 mg/l, while the F/M ratio was kept constant at 0.8 g COD/gMLSS·d.

The pH across the reactors was maintained at 6.8 by dosing caustic soda (NaOH) as required. Temperature was maintained at about 37° C. and dissolved oxygen (DO) concentration was maintained at 2.5 mg/l. Nitrogen was dosed in the form of Urea at a C:N mass ratio of 20:1. Phosphorus was dosed in the form of Phosphoric acid at a N:P mass ratio of 2:1 to 5:1.

The investigation was assessed by the key requirements of the cultivated sludge, such as the time to acclimatise the domestic activated sludge, acceptable sludge quality during and after the acclimatisation phase, optimal sludge growth and compliance to all set effluent parameters. The results of the experiments are set out in Tables 2 and 4 to 7 hereunder.

The investigation was aimed at, inter alia, achieving a varied and balanced population of protozoa in the biomass. Protozoa types in the biomass of the seed sludge and the final cultivated sludge after the acclimatisation phase were investigated, and the results are provided in Table 2 hereunder.

TABLE 2

Presence of Protozoa types in seed sludge and final cultivated sludge

| Protozoa | Seed Sludge | Final Cultivated Sludge |
|---|---|---|
| Rotifers | Present in the seed sludge | Present in the final cultivated sludge. Excessive numbers of rotifers were found to breakup and destroy floc structure. |
| Amoebae | Rarely present in the seed sludge | Never present/observed in the final cultivated biomass. |
| Flagellates | Present but in low numbers in the seed sludge | Dominant under excessive organic loading during commissioning and results in dispersion of floc particles. |
| Free-swimming ciliates | Present in seed sludge, but was not excessive | Found during initial stages of commissioning, but disappeared over time. Presence of ciliates in low numbers is indication of healthy sludge. |
| Crawling ciliates | Present in seed sludge, but was not excessive | Found during initial stages of commissioning, but disappeared over time. Presence of ciliates in low numbers is indication of healthy biomass. Alternate with stalked ciliates as the dominant group of protozoa. |
| Stalked ciliates | Present in seed sludge, but was not excessive | Found during initial stages of commissioning, but disappeared overtime. |

The sludge quality was determined by microscopic imaging of the sludge. The qualitative characteristics evaluated were the floc structure and size. The aim was to achieve medium to large, round compact; good settling floc with filamentous backbones internal to the flocs. The presence and abundance of healthy nitrifying colonies is also essential. The resulting sludge qualities are depicted in FIGS. 2-6.

Figure 2:
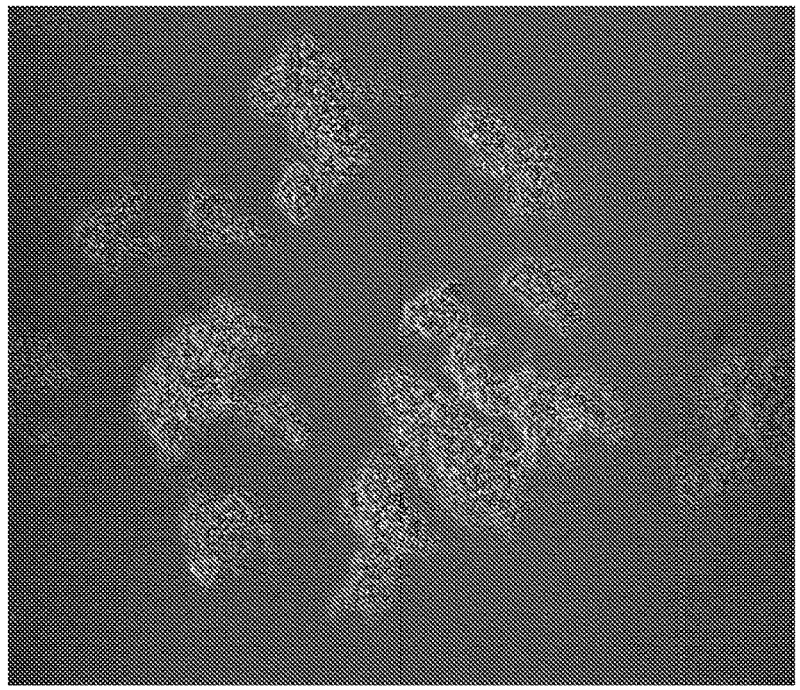
FIG. 2 shows, for the Example, a photograph of floc structures of a biomass produced in accordance with the invention, with the floc structures being round and dense, with filamentous backbones internal to the floc with nitrifier colonies.
Figure 3:
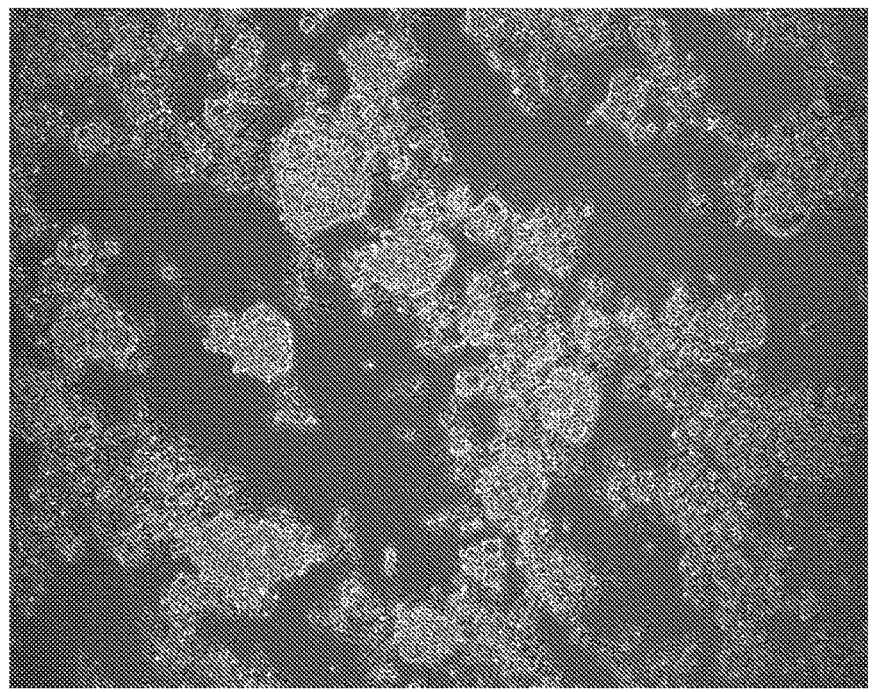
FIG. 3 shows, for the Example, a photograph of abundant dense nitrifier colonies.

FIG. 2 shows floc structures of a biomass produced with the floc structures being round and dense, with filamentous backbones internal to the floc with nitrifier colonies, which indicates a biomass of good quality, with good settling properties. FIG. 3 shows a photograph of abundant dense nitrifier colonies which are preferred for optimised nitrification/desertification conditions in the process of the invention.

Figure 4:
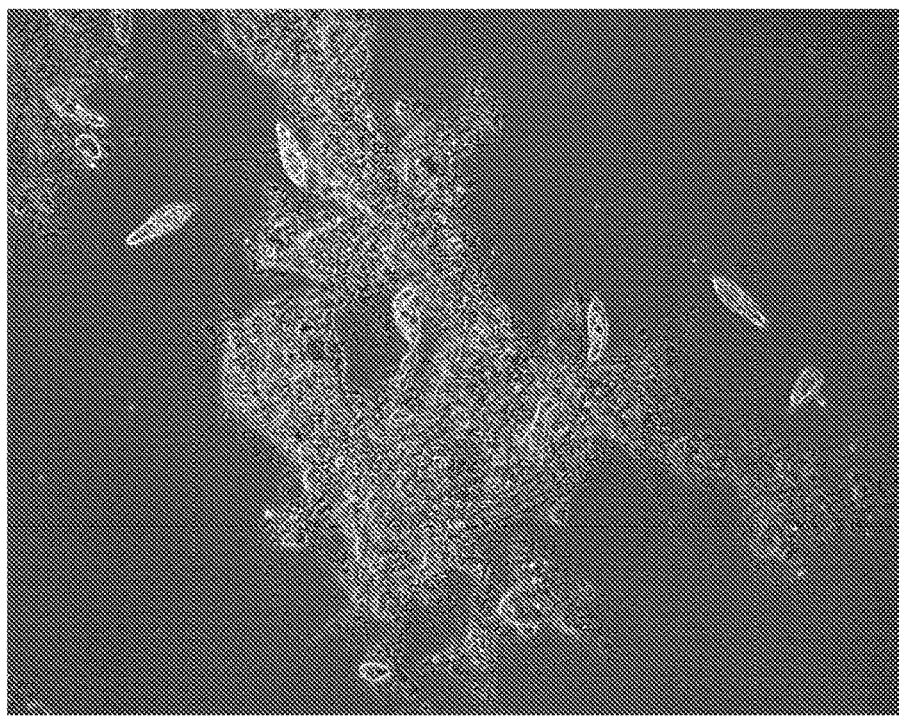
FIG. 4 shows, for the Example, a photograph of an unhealthy number of Rotifers breaking up the flow structure.
Figure 5:
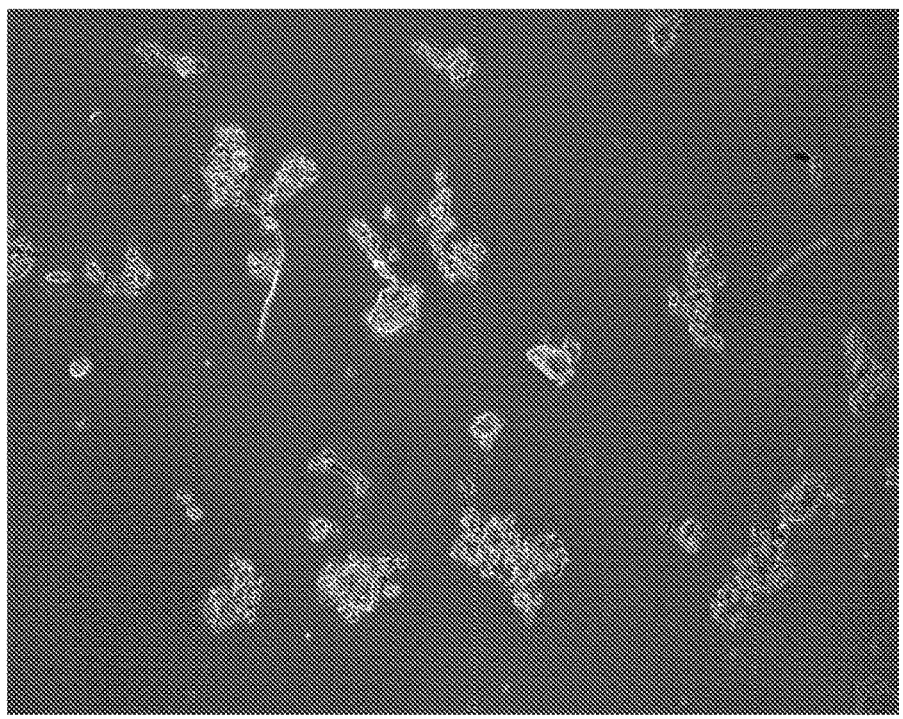
FIG. 5 shows, for the Example, photograph of flocs being of small and irregular size, with low filamentous abundance.
Figure 6:
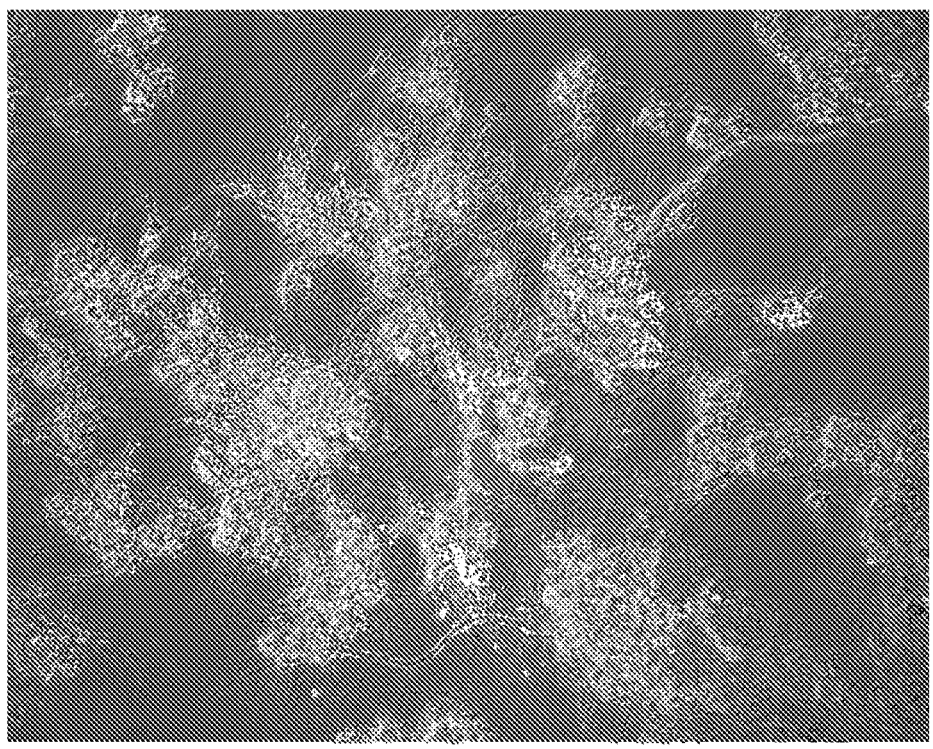
FIG. 6 shows, for the Example, a photograph of flocs displaying excessive filamentous growth.

On the other hand, FIG. 4 shows a photograph of an unhealthy number of Rotifers breaking up the flow structure, leading to poor, irregular floc structures resulting in poor sludge settling during clarification. Similarly FIG. 5 shows a photograph of flocs being of small and irregular size, with low filamentous abundance, and resulting in poor settling and unacceptable effluent qualities whereas FIG. 6 shows a photograph of flocs displaying excessive filamentous growth, leading to the unacceptable bulking daily classification.

The assessed sludge quality was translated into quantitative values using the quantitative scoring system provided in Table 3 below.

TABLE 3

The class score of activated sludge with use of microscopic analyses.

| Ranking | Visual | Score |
|---|---|---|
| Excellent | Robust flocks between 200-1000 μm, some protozoa, Healthy amount of Filaments. Abundant Nitrifier colonies. | 100 |

TABLE 3-continued

The class score of activated sludge
with use of microscopic analyses.

| Ranking | Visual | Score |
|---|---|---|
| Good | Medium flocks, protozoa, 1-10 free bacteria per 25 μm², Healthy amount of Filaments. Healthy amount of Nitrifier colonies | 80 |
| Average | Small flocks, no protozoa, 20-30 free bacteria per 25 μm², several filaments. Low numbers of Nitrifier colonies | 30 |
| Poor | Pin flocks or no flocks, no protozoa, excessive free bacteria, excessive filaments, Yeast and fungi. No Nitrifiers. | 10 |

The sludge quality was assessed at varied F/M ratios, provided in Table 4, and varied MLSS, provided in Table 7. The class scores at varied F/M ratio and MLSS are provided in Tables 5 and 8 respectively.

Tables 5 and 8 illustrate the qualitative interpretation of sludge quality translated to a quantitative scoring system for sludge quality. It is clear from the results in Tables 5 and 8 that the F/M of 0.8 provides a desired growth rate and sludge quality.

Table 6 illustrates sludge volume index (SVI) measurements qualities at Days 14 and Days 35 of operation, at the varied F/M ratio as provided in Table 4. It was desired to obtain an SVI of from of 50 to 300 ml/gram, but lower SVI values are preferred for solid liquids separation with clarifiers. Preferably the SVI should be lower than 150 ml/gram. It was found that at F/M ratio of below 1 kg COD/kg MLSS, the SVI value was significantly lower compared to 20 F/M ratios above 1 kg COD/kg MLSS. These results therefore indicate that the biomass produced in this lower F/M ratio range is of a good quality and possessed a desirable floc structure. In particular the results show that at an F/M ratio of 0.8 kg COD/kg MLSS the SVI value achieved is relatively lower, and thus most preferred.

It was found that at day 35 and at an F/M ratio of 0.8 kg COD/kg MLSS the desired MLSS and good quality biomass were achieved. The systems were operated for three biological cell ages (CRT), namely 18, 25 and 35 days, to verify successful commissioning. Maintaining a CRT of 35 days was found to give best results. The final effluent was monitored to ensure compliance with the set effluent quality requirements.

TABLE 4

Start-up operating parameters for activated
sludge reactors with varying F/M ratio.

| Parameters | Reactor 1 | Reactor 2 | Reactor 3 | Reactor 4 |
|---|---|---|---|---|
| F/M (kg COD/kg MLSS) | 0.2 | 0.4 | 0.8 | 1 |
| MLSS (mg/l) | 3500 | 3500 | 3500 | 3500 |
| DO (mg/l) | 2.5 | 2.5 | 2.5 | 2.5 |
| pH | 6.8 | 6.8 | 6.8 | 6.8 |
| Temperature (° C.) | 37 | 37 | 37 | 37 |

| Parameters | Reactor 5 | Reactor 6 |
|---|---|---|
| F/M (kg COD/kg MLSS) | 1.5 | 2 |
| MLSS (mg/l) | 3500 | 3500 |
| DO (mg/l) | 2.5 | 2.5 |
| pH | 6.8 | 6.8 |
| Temperature (° C.) | 37 | 37 |

TABLE 5

The class score of activated sludge with use of microscopic
analyses of the experimental reactors with varying F/M ratio,
at differing biological cell ages.

| | Reactor 1 | Reactor 2 | Reactor 3 | Reactor 4 | Reactor 5 | Reactor 6 |
|---|---|---|---|---|---|---|
| Sludge Ranking Day 14 | 70 | 77 | 92 | 67 | 74 | 71 |
| Sludge Ranking Day 35 | 75 | 72 | 90 | 52 | 40 | 48 |

TABLE 6

Sludge Volume Index of the activated sludge with varying F/M ratio.

| | Reactor 1 | Reactor 2 | Reactor 3 | Reactor 4 | Reactor 5 | Reactor 6 |
|---|---|---|---|---|---|---|
| SVI (ml/gram) Day 14 | 101 | 109 | 80 | 150 | 143 | 147 |
| SVI (ml/gram) Day 35 | 99 | 94 | 83 | 178 | 206 | 198 |

TABLE 7

Start-up operating parameters for the 0.2 m³ activated
sludge reactors with varying MLSS concentration.

| Parameters | Reactor 1 | Reactor 2 | Reactor 3 |
|---|---|---|---|
| F/M (kg COD/kg MLSS · d) | 0.8 | 0.8 | 0.8 |
| MLSS (mg/l) | 800 | 1500 | 3500 |
| DO (mg/l) | 2.5 | 2.5 | 2.5 |
| pH | 6.8 | 6.8 | 6.8 |
| Temperature (° C.) | 37 | 37 | 37 |

TABLE 8

The class score of activated sludge with use of microscopic analyses
of the experimental reactors with varying MLSS concentration.

| | Reactor 1 | Reactor 2 | Reactor 3 |
|---|---|---|---|
| Sludge Ranking Day 35 | 76 | 92 | 83 |

The invention thus provides a means for cultivating a microbial biomass or sludge that can be used in the treatment of industrial waste water, particularly FT reaction water, to produce a treated purified effluent to the specification of beneficial use or discharge quality.

The invention claimed is:

1. A process for producing in a reactor a biomass for use in the treatment of Fischer-Tropsch (FT) reaction water, the process comprising:
introducing a nutrient component and water into an aerobic reaction zone containing a seed sludge, wherein the nutrient component comprises Nitrogen (N), Phosphorus (P) and a synthetic feed that comprises a Carbon (C) source consisting of acetic acid;

maintaining, in the aerobic reaction zone and under aerobic conditions, a F/M ratio of from 0.4 to 1.0 kg COD/kg MLSS·day for a period of time sufficient to produce an acclimatized biomass for subsequent use in the treatment of FT reaction water; and after the period of time, discontinuing the introduction of the synthetic feed to the aerobic reaction zone and, after the period of time, introducing a feed stream comprising an aqueous mixture of carbon compounds to a zone that is upstream of and in fluid communication with the aerobic reaction zone, where F/M=Food to Microorganism Ratio;

COD=Chemical Oxygen Demand, expressed as mg oxygen/l of liquid in the aerobic reaction zone; and MLSS=Mixed Liquor Suspended Solids, expressed as mg solids in the aerobic reaction zone/l of liquid in the aerobic reaction zone.

2. The process according to claim 1, wherein the seed sludge is an aerobic domestic activated sludge.

3. The process according to claim 2, wherein the F/M ratio that is maintained in the aerobic reaction zone during the period of time is about 0.8 kg COD/kg MLSS·day.

4. The process according to claim 1, wherein C and N introduced into the aerobic reaction zone are present in a C:N mass ratio of from 20:1 to 60:1, wherein C is expressed as COD.

5. The process according to claim 1, wherein N and P introduced into the aerobic reaction zone are present in a N:P mass ratio of from 2:1 to 5:1.

6. The process according to claim 1, wherein MLSS is about 800 mg/l or above.

7. The process according to claim 6, wherein MLSS is about 1500 mg/l or above.

8. The process according to claim 1, wherein pH in the aerobic reaction zone is maintained in the range of from 6.5 to 7.5 during the period of time.

9. The process according to claim 8, wherein a minimum alkalinity concentration of 75 mg/l as $CaCO_3$ is maintained in the aerobic reaction zone during the period of time.

10. The process according to claim 1, wherein a dissolved oxygen concentration of 1.5 to 3.0 mg/l is maintained in the aerobic reaction zone during the period of time.

11. The process according to claim 10, wherein the dissolved oxygen concentration in the aerobic reaction zone is maintained at 2.5 to 3.0 mg/l during the period of time.

12. The process according to claim 1, wherein the aerobic reaction zone is maintained at a temperature in the range of 32° C. to 42° C. during the period of time.

13. The process according to claim 12, wherein the aerobic reaction zone is maintained at a temperature of about 37° C. during the period of time.

14. The process according to claim 1, wherein the biomass has a cell residence time (CRT) in the aerobic reaction zone of from 18 to 45 days during the period of time.

15. The process according to claim 14, wherein the biomass has a cell residence time of about 35 days during the period of time.

16. Biomass produced by the process of claim 1.

* * * * *